(12) United States Patent
Frembgen et al.

(10) Patent No.: US 11,521,518 B1
(45) Date of Patent: Dec. 6, 2022

(54) AIRWAY SIMULATION SYSTEM

(71) Applicant: IngMar Medical, Ltd., Pittsburgh, PA (US)

(72) Inventors: Stefan Frembgen, Pittsburgh, PA (US); James J. Fialho, Pittsburgh, PA (US); Joel Neatrour, Pittsburgh, PA (US)

(73) Assignee: IngMar Medical, Ltd., Pittsburgh, PA (US)

( * ) Notice: Subject to any disclaimer, the term of this patent is extended or adjusted under 35 U.S.C. 154(b) by 1252 days.

(21) Appl. No.: 15/971,234

(22) Filed: May 4, 2018

Related U.S. Application Data

(60) Provisional application No. 62/501,130, filed on May 4, 2017.

(51) Int. Cl.
   *G09B 23/30* (2006.01)
   *G09B 23/28* (2006.01)

(52) U.S. Cl.
   CPC .......... *G09B 23/288* (2013.01); *G09B 23/30* (2013.01)

(58) Field of Classification Search
   CPC .................................................. G09B 23/28
   USPC ......................................................... 434/265
   See application file for complete search history.

(56) References Cited

U.S. PATENT DOCUMENTS

| | | | | | |
|---|---|---|---|---|---|
| 5,975,748 | A | * | 11/1999 | East, IV | G09B 23/28 703/6 |
| 2012/0247235 | A1 | * | 10/2012 | Adamo | A61K 31/496 73/865.4 |
| 2014/0234229 | A1 | * | 8/2014 | Corr | A61K 31/573 424/45 |
| 2014/0329215 | A1 | * | 11/2014 | Pugh | G09B 23/288 434/267 |
| 2017/0263159 | A1 | * | 9/2017 | Eichhorn | G09B 23/34 |
| 2019/0333414 | A1 | * | 10/2019 | Nakano | G09B 23/32 |

OTHER PUBLICATIONS

"Breath Simulation Module for Use with Dual Adult Training/Test Lungs," Michigan Instruments, https://web.archive.org/web/20170102015955/https://jdhmedical.com/wp-content/pdfs/breath%20simulation.pdf, Jan. 2, 2017 (Year: 2017).*

"Comparative Evaluation of Methods for Ensuring the Correct Position of the Tracheal Tube in Children Undergoing Open Heart Surgery," Kim et al., Anaesthesia, 2003, vol. 58, pp. 889-892 (Year: 2003).*

* cited by examiner

*Primary Examiner* — Kurt Fernstrom
(74) *Attorney, Agent, or Firm* — The Webb Law Firm

(57) ABSTRACT

An airway simulation system includes a simulated airway having a hollow body defining a passageway therein with a first portion and a second portion. The second portion includes a bifurcated section having a left branch section and a right branch section and connects to the first portion at the distal end of the first portion. The simulated airway includes at least one orifice defined along the hollow body and in communication with at least one pressure transducer. One branch of the left branch section and the right branch section is configured to receive airflow from a distal end, and the other of the left branch section and the right branched section includes a cap at a distal end to prevent airflow from being received by the distal end of the capped branch. A method for simulating a human airway is also disclosed.

20 Claims, 8 Drawing Sheets

AIRWAY SIMULATION SYSTEM

CROSS REFERENCE TO RELATED APPLICATIONS

This application claims priority to U.S. Provisional Application No. 62/501,130 filed May 4, 2017, the disclosure of which is hereby incorporated in its entirety by reference.

BACKGROUND OF THE INVENTION

Field of the Invention

The present invention is directed to an airway simulation system and a method of simulating a human airway.

Description of Related Art

Medical manikins are used to train medical professionals. The most basic models of manikins are torso-only models used for basic first aid training, CPR training, and choking training. More advanced manikins have other functions, such as simulating arrhythmias, heart attacks, or other emergency situations. The most advanced manikins can simulate symptoms or responses, such as blinking, sweating, breathing and pupil dilation, and can even speak and respond to questions.

Many medical manikins are equipped with an on-board or external computer running a physiological model which takes input from the manikin (i.e., responds to something done to it) and controls the manikin's response to the inputs. However, to be effective, the manikin must be able to accept outside stimuli in a meaningful manner, that is, in response to actual actions performed by a medical professional during treatment.

Current manikins lack the ability to respond properly to stimuli provided to the airway. When a medical professional correctly or incorrectly performs an intubation on a manikin, there is no way for the manikin to translate the actions of the medical professional into input to the physiological model, such that the manikin can provide the proper response. For example, placing the tube into the airway such that it comes into contact with the carina should elicit a cough response from the manikin Currently, input is provided to the physiological model not in response to a direct action of the medical professional, but by simulating the direct action of the medical professional via another input to the physiological model, most likely using a computer to provide the input to the model.

Therefore, it would be desirable to have a way to translate the actions of the medical professional directly into inputs to the physiological model when performing operations on the airway of the manikins.

SUMMARY OF THE INVENTION

The present invention is directed to an airway simulation system including: a simulated airway including a hollow body defining a passageway therein including a first portion and a second portion. The first portion includes a first section having a proximal end and a distal end. The second portion includes a bifurcated section having a left branch section and a right branch section. The second portion connects to the first portion at the distal end of the first portion. At least one orifice is defined along the hollow body and is in communication with at least one pressure transducer. One branch of the left branch section and the right branch section is configured to receive airflow from a distal end, and the other of the left branch section and the right branched section includes a cap at a distal end to prevent airflow from being received by the distal end of the capped branch.

In some non-limiting examples, the at least one orifice may include a plurality of orifices. The plurality of orifices may include: a first orifice defined along the first portion; a second orifice defined along the first portion, where the second orifice is defined closer to the distal end of the first portion than the first orifice; a third orifice defined along the right branch section; and a fourth orifice defined along the left branch section. The first orifice, the second orifice, the third orifice, and the fourth orifice may be in communication with a first pressure transducer, a second pressure transducer, a third pressure transducer, and a fourth pressure transducer, respectively. The airway simulation system may include a manifold and an air pump, the manifold having an input and at least four outputs, where each output is in fluid communication with one of the first orifice, the second orifice, the third orifice, and the fourth orifice, and the air pump is in fluid communication with the input to provide airflow through the first orifice, the second orifice, the third orifice, and/or the fourth orifice into the hollow body of the simulated airway. The airway simulation system may further include a controller, where the at least one pressure transducer is in communication with the controller, where a pressure sensed by the at least one pressure transducer causes the controller to generate a simulated response.

In some non-limiting examples, the airway simulation system may further include a carina component and a carina pressure transducer, where the carina component is positioned at a bifurcation point between the left branch section and the right branch section, and the carina component is in communication with the carina pressure transducer. The airway simulation system may include a controller, where the carina pressure transducer is in communication with the controller, such that when the simulated airway exerts a pressure on the carina component, a signal is communicated to the carina pressure transducer to cause the controller to generate a simulated cough response. The airway simulation system may include a gas sensor configured to sense the presence of a gas released by an inhaler in the simulated airway. The airway simulation system may include a pump configured to pump gas from the hollow body of the simulated airway to the gas sensor. The gas may include a volatile organic compound or R-134a propellant. The pump may be configured to pump the gas sensed by the gas sensor back into the simulated airway via the at least one orifice.

In some non-limiting examples, the airway simulation system may further include a lung simulator in fluid communication with the branched section configured to receive airflow from the distal end. The airway simulation system may further include a medical instrument configured to be inserted into the proximal end of the first portion of the hollow body of the simulated airway. The medical instrument may include an endotracheal (ET) tube. A controller may be configured to generate a simulated human response based on a position of the ET tube in the hollow body of the simulated airway. The controller may communicate with the at least one pressure transducer in communication with the at least one orifice of the simulated airway to determine the position of the ET tube in the hollow body of the simulated airway.

The present invention is also directed to a method for simulating a human airway including providing the airway simulation system including a simulated airway including a hollow body defining a passageway therein including a first portion and a second portion. The first portion includes a first section having a proximal end and a distal end. The second portion includes a bifurcated section having a left branch section and a right branch section. The second portion connects to the first portion at the distal end of the first portion. At least one orifice is defined along the hollow body and is in communication with at least one pressure transducer. One branch of the left branch section and the right branch section is configured to receive airflow from a distal end, and the other of the left branch section and the right branched section includes a cap at a distal end to prevent airflow from being received by the distal end of the capped branch. The method includes inserting an endotracheal (ET) tube into the hollow body of the simulated airway and detecting a position of the ET tube in the hollow body of the simulated airway.

In some non-limiting examples, the method may include generating, via a controller, a simulated human response upon detecting the position of the ET tube in the hollow body of the simulated airway. The controller may communicate with the at least one pressure transducer in communication with the at least one orifice of the simulated airway to determine the position of the ET tube in the simulated airway.

DESCRIPTION OF THE INVENTION

Figure 1:
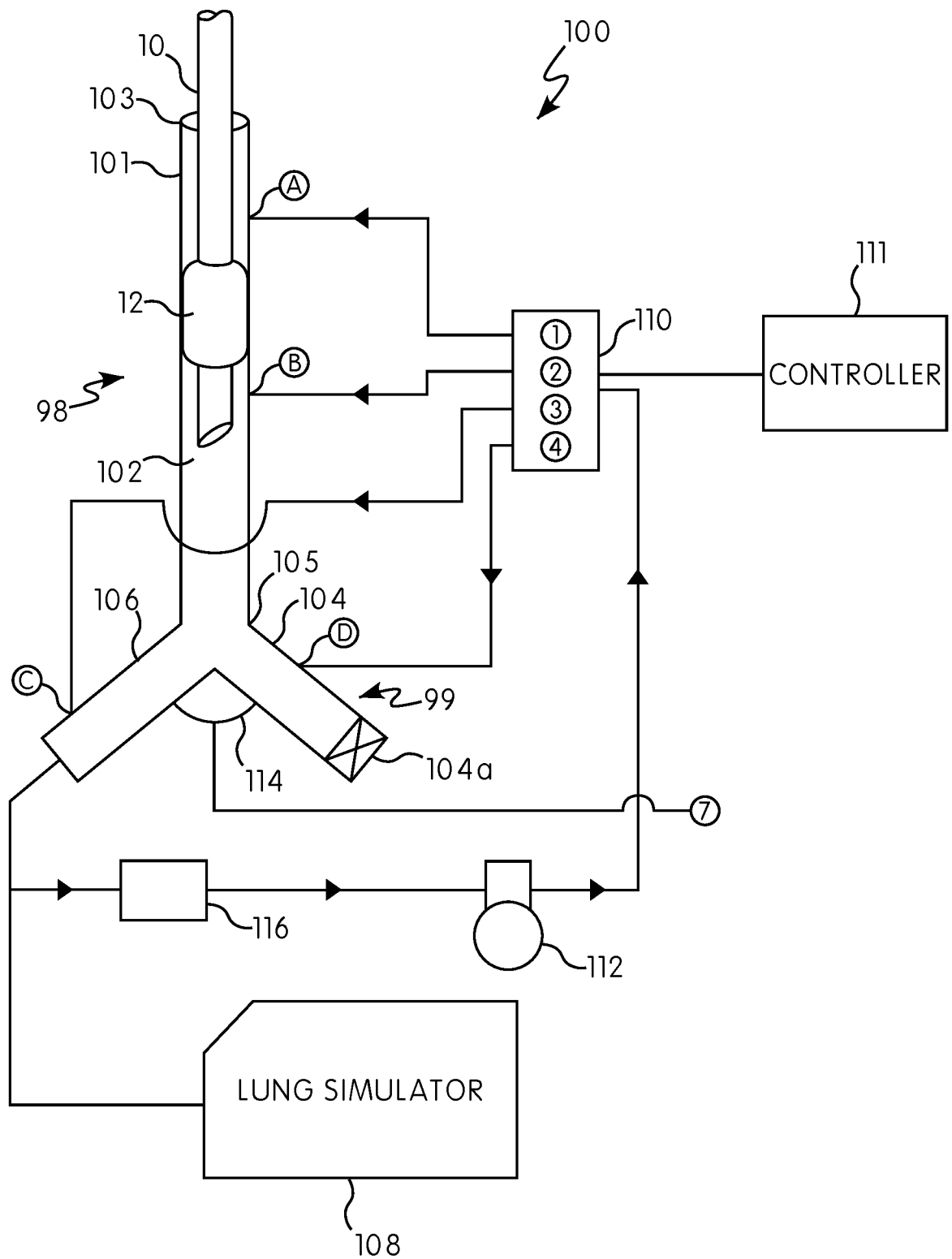
FIG. 1 shows a schematic view of one non-limiting embodiment of an advanced mechanical airway for use in a medical manikin.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Endotracheal Tube Position Sensing System

Referring to FIG. 1, an airway simulation system 100 having a simulated airway 101 is shown. The simulated airway 101 may include a trachea portion 102 that models a human trachea and bifurcates into a left main bronchial stem portion 104 and a right main bronchial stem portion 106. The simulated airway 101 may include a hollow body defining a passageway therein composed of a deformable material, such as silicon or a polymer and is sized in proper relation to an actual airway of a human. The hollow body may include a first portion 98 corresponding to the trachea portion 102, and the first portion 98 may include a single section having a proximal end 103 and a distal end 105. As used herein, proximal means proximate the mouth of the simulated human, and distal means distant from the mouth of the simulated human compared to the proximal portion. The hollow body may further include a second portion 99 having a bifurcated section including the left main stem 104 and the right main stem 106. The bifurcation may be accomplished via a rigid "Y" connector connecting the main tube to two smaller tubes, or the tube may be directly molded in a bifurcated manner. The second portion 99 of the hollow body may connect to the first portion 98 of the hollow body at the distal end 105 of the first portion 98, as shown in FIG. 1.

With continued reference to FIG. 1, the simulated airway 101 may be in fluid communication with a lung simulator 108 via the right main stem 106 (left main stem 104 and right main stem 106 by convention from the perspective of the patient rather than from the perspective of a person looking down from above). Accordingly, the lung simulator 108 simulates human breathing activity through the simulated airway 101 via the right main stem 106.

With continued reference to FIG. 1, the simulated airway 101 may include at least one orifice defined along its length (marked with references A, B, C, and D in FIG. 1). Orifice A may be defined along the trachea portion 102 proximate the proximal end 103 of the first portion 98 of the hollow body. Orifice B may be defined along the trachea portion 102 closer to the distal end 105 of the first portion 98 of the hollow body than orifice A. Orifice C may be defined along the right main stem 106. Orifice D may be defined along the left main stem 104. Other orifices may be defined in the simulated airway 101 as necessary. Air may be continuously delivered into the simulated airway 101 through the orifices via a manifold 110 that is fed by an air pump 112. Because air flows continuously through orifices A-D, the orifices and attached tubing are prevented from becoming contaminated with foreign matter.

With continued reference to FIG. 1, the pressure in each individual tube leading to orifices A-D may be monitored with pressure transducers, numbered 1, 2, 3, and 4 in FIG. 1, which may be in fluid communication with orifices A, B, C, and D (e.g., via tubing), respectively. As used herein, the term "transducer" refers to a device that receives a signal in the form of one type of energy and converts it into a signal in another form. The transducers described herein may also function as a sensor, which is a device capable of detecting, measuring, and/or recording a physical phenomenon and responding by transmitting information, initiating changes, and/or operating controls.

In one example, when the lung simulator 108 is operating (either actively or passively under assisted external ventilation) and an endotracheal tube (ET tube) 10 (or other medical instrument) is inserted into the simulated airway 101 into the position shown in FIG. 1, pressure transducers 2, 3, and 4 are able to detect the breathing waveform (which simulates human lung activity) created by the lung simulator 108 (which appears as an alternating positive and negative air pressure waveform) via orifices B, C, and D. As previously defined, the pressure transducers may function as pressure sensors, and pressure transducers 1-4 may be interchangeably referred to as sensors 1-4, respectively. Sensor 1, in the example of FIG. 1, is at ambient pressure and does not see the breath waveform from the lung simulator, as the inflatable cuff 12 of ET tube 10 restricts the movement of air from lung simulator 108. Controlling software run on a controller 111 in communication with the pressure transducers 1-4 receives a signal from the pressure transducers and is able to determine the position of the ET tube 10, which is below orifice A but above orifice B. This represents a "normal" intubation position in a patient.

If the ET tube 10 is advanced to a position below orifice B, sensors 3 and 4 read a breath waveform while sensors 1 and 2 are quiescent. Applying the same logic as described in the previous scenario, the controller 111 determines that ET tube 10 is below orifices A and B but above orifices C and D. The same logical conditions apply if the ET tube 10 is inserted into the right main bronchial stem 106. In this case, only sensor 3 sees the breath waveform, through orifice C, and the controller 111 determines that the right main stem 106 is intubated, which is an undesirable position for the ET tube 10 in a real human patient.

In an example in which the left main bronchial stem 104 is intubated, the logic operates somewhat differently. In this scenario, sensors 1, 2, and 3 are quiescent because orifices A, B, and C are at ambient pressure due to the lack of resistance in the now minimally obstructed trachea portion 102. Orifice D is defined along the left main stem 104 such that the inflated ET tube cuff 12 occludes orifice D (orifice D is defined such that a left tube intubation will occlude the orifice). Because the air being delivered into occluded orifice D has no outlet, the resulting pressure increase prompts the controller 111 to determine that the left main stem is intubated, which is also an undesirable position for the ET tube 10 in a real human patient. The left main stem 104 may be capped at the end by cap 104a to prevent air from escaping or entering via its distal end. The lung simulator 108 may be connected to only one of the left or right main stems (the right main stem 106 in the illustrated example) such that it is possible to detect a right or left stem intubation.

Figure 7:
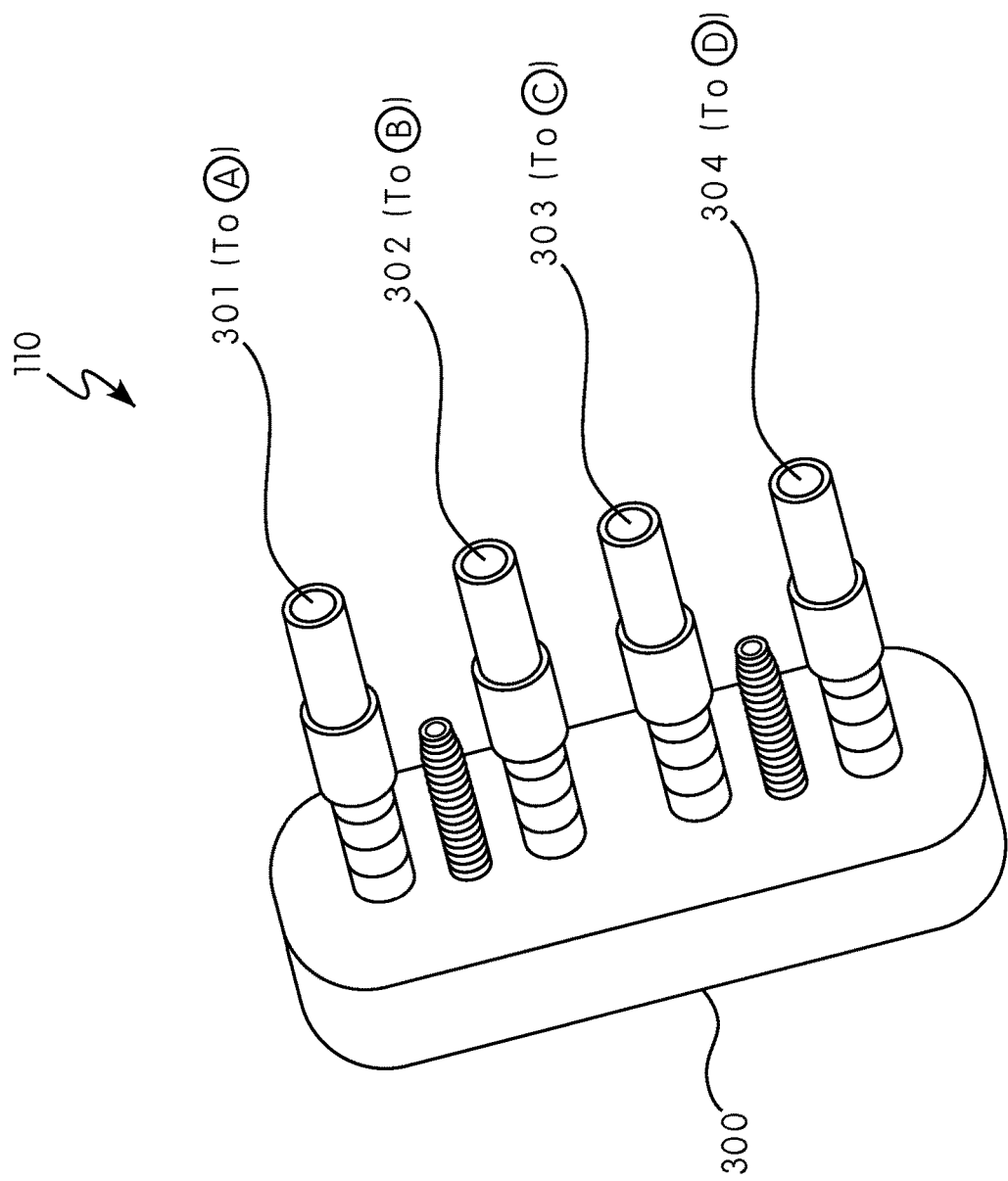
FIG. 7 shows a perspective view of the manifold shown in FIG. 1.

With continued reference to FIG. 1, sensors 1-4 may be located inside of manifold 110 or in between manifold 110 and orifices A-D. The manifold 110, as shown in FIG. 7, may be equipped with a single input opening 300 in communication with the air pump 112, expanding within the manifold 110 to four output openings 301-304, in communication respectively with orifices A-D via tubing. Openings 301-304 may be varied in size to regulate the airflow pressure at orifices A-D and to prevent a change in pressure from one or more orifices from disrupting airflow though the other orifices.

Figure 2:
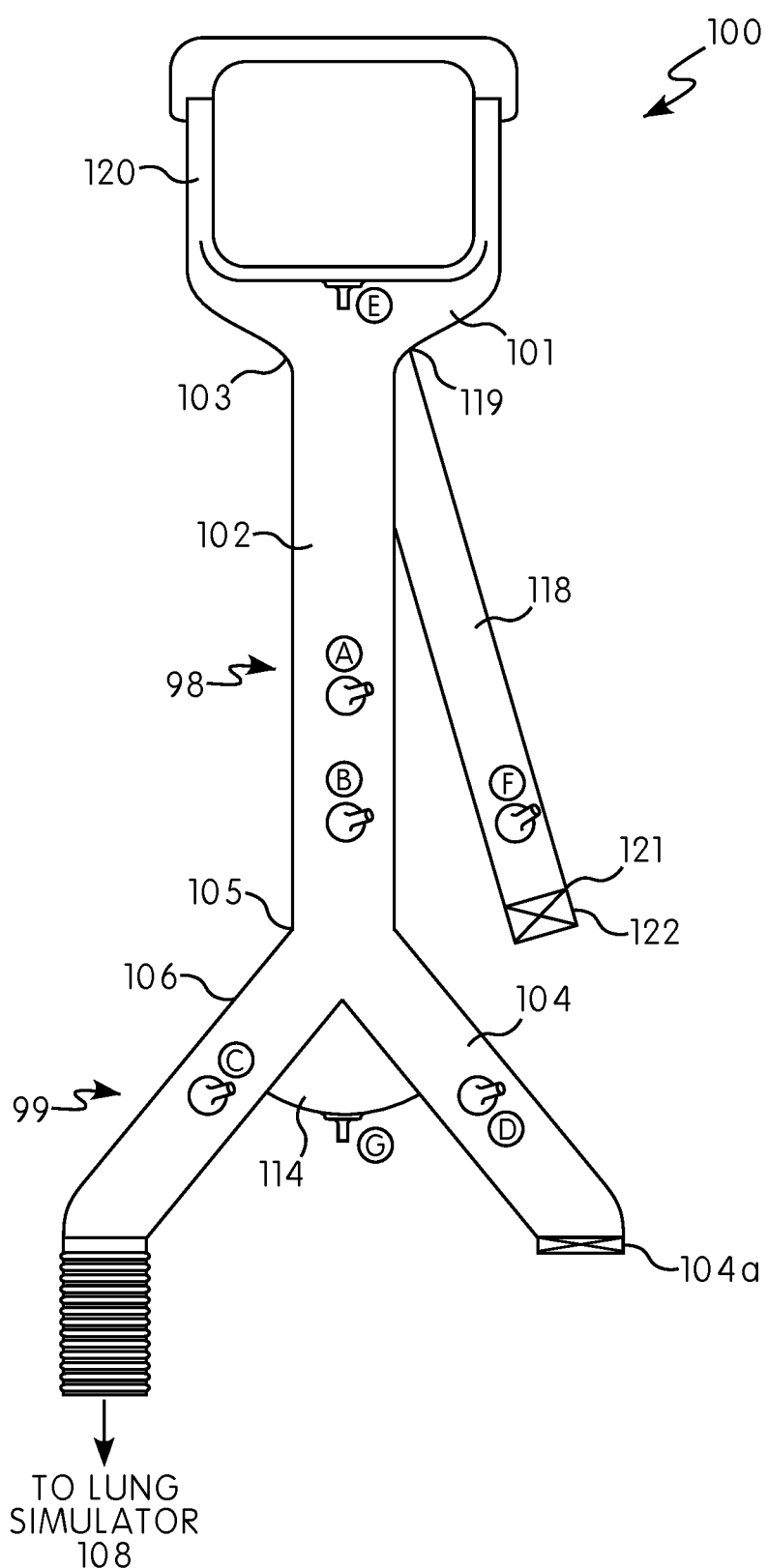
FIG. 2 shows a side view of another non-limiting embodiment of an advanced mechanical airway for use in a medical manikin.
Figure 3:
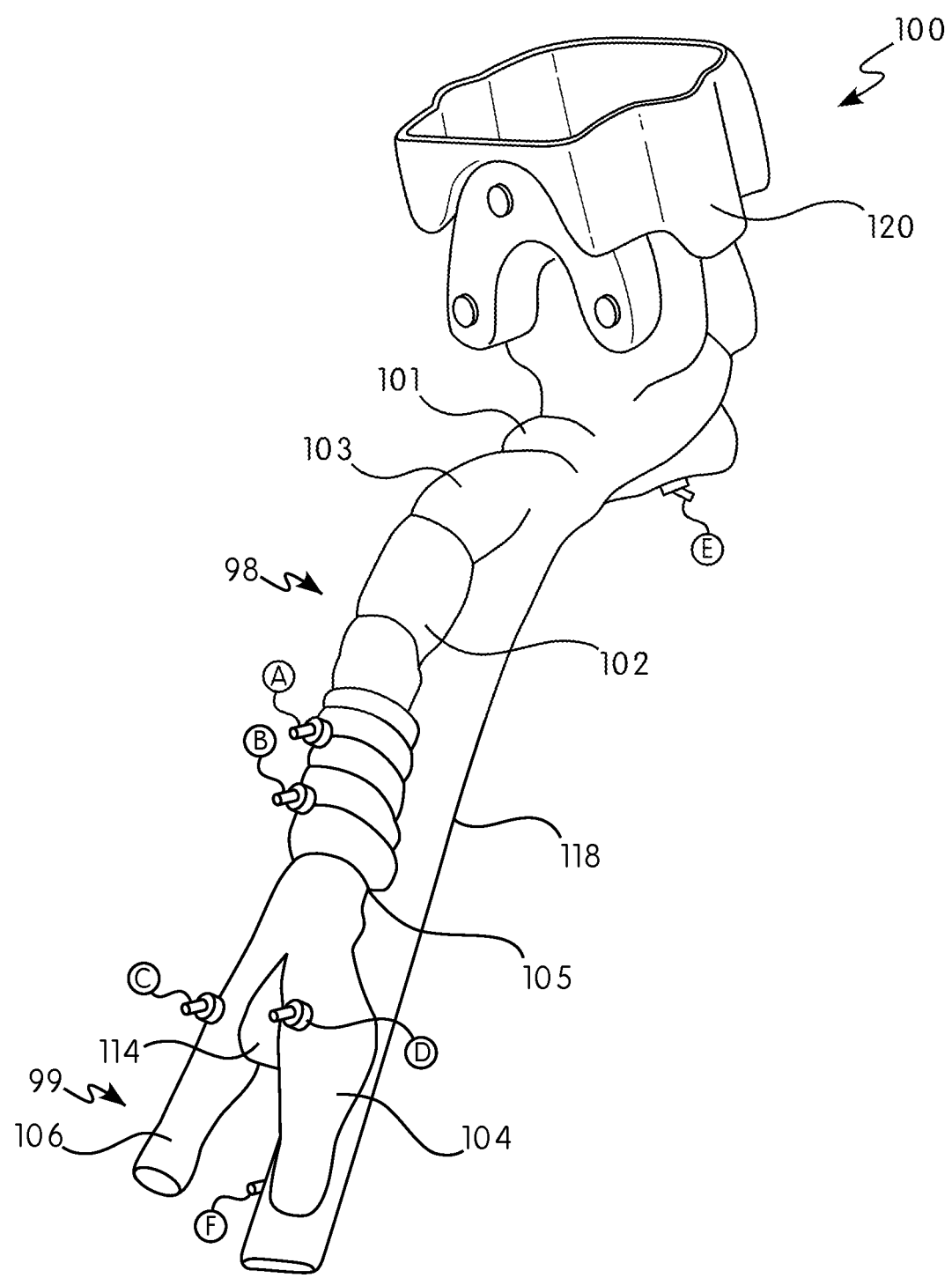
FIG. 3 shows a perspective view of another non-limiting embodiment of an advanced mechanical airway for use in a medical manikin.

Referring to FIGS. 2 and 3, another non-limiting embodiment of an airway simulation system 100 is shown. The system 100 shown in FIGS. 2 and 3 is different from that shown in FIG. 1 in the following ways. The simulated airway 101 may further include a simulated mouth portion 120, which may have the same general structure as a human mouth. The simulated mouth portion 120 may be connected to the proximal end 103 of the first portion of the hollow body, so as to be in fluid communication with the trachea portion 102. The simulated mouth portion 120 may define an orifice (orifice E), which may be in communication with a fifth pressure transducer 5 (see FIG. 5). Therefore, the airway simulation system 100 may detect and monitor the pressure in the simulated mouth portion 120 using orifice E and pressure transducer 5.

With continued reference to FIGS. 2 and 3, the simulated airway 101 may further include an esophageal portion 118. The esophageal portion 118 may include a proximal end 119 and a distal end 121 and may include a cap 122 at the distal end. The esophageal portion 118 may be in fluid communication with the trachea portion 102. The esophageal portion 118 may simulate the size and shape of a human esophagus (or an upper section thereof). The esophageal portion 118 may define an orifice (orifice F), which may be in communication with a sixth pressure transducer 6 (see FIG. 4). Therefore, the airway simulation system 100 may detect and monitor the pressure in the esophageal portion 118 using orifice F and pressure transducer 6.

Figure 4:
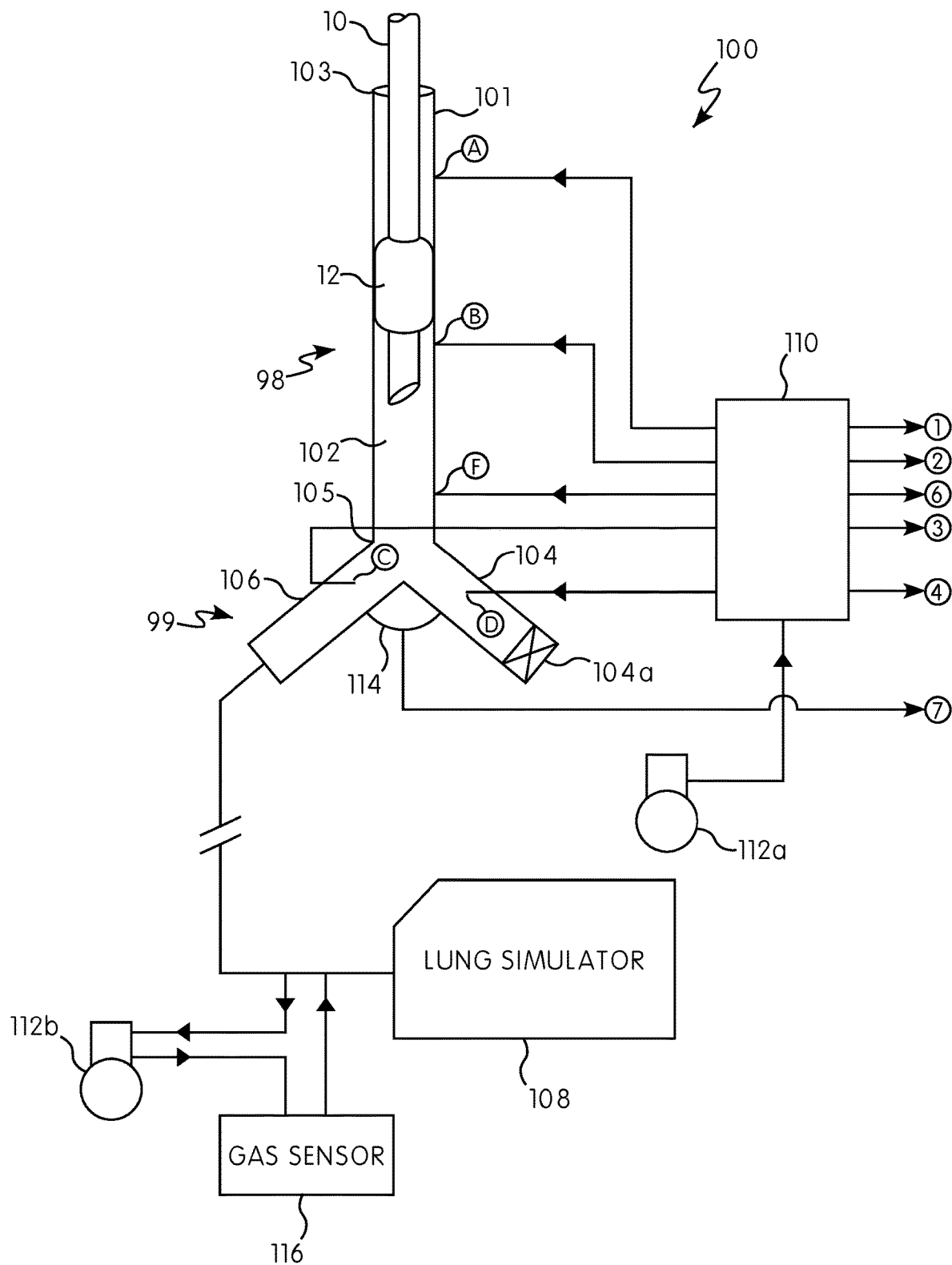
FIG. 4 shows a schematic view of another non-limiting embodiment of an advanced mechanical airway for use in a medical manikin.

Referring to FIG. 4, another non-limiting embodiment of an airway simulation system 100 is shown. The system 100 shown in FIG. 4 is different from that shown in FIG. 1 or FIGS. 2 and 3 in the following ways. In the system 100 of FIG. 4, orifices A-D and F are present, as are sensors 1-4 and 6. The manifold 110 allows for fluid communication between the orifices A-D and F with sensors 1-4 and 6, respectively, so that the respective pressures may be determined and monitored.

Moreover, with continued reference to FIG. 4, the air pump 112 from FIG. 1 may be two separate air pumps: a first air pump 112a and a second air pump 112b. The first air pump 112a may be in fluid communication with the manifold 110, such that air from the air pump 112a may flow through piping, which flows to the orifices (A-D and F in this example), and into the simulated airway 101.

Figure 5:
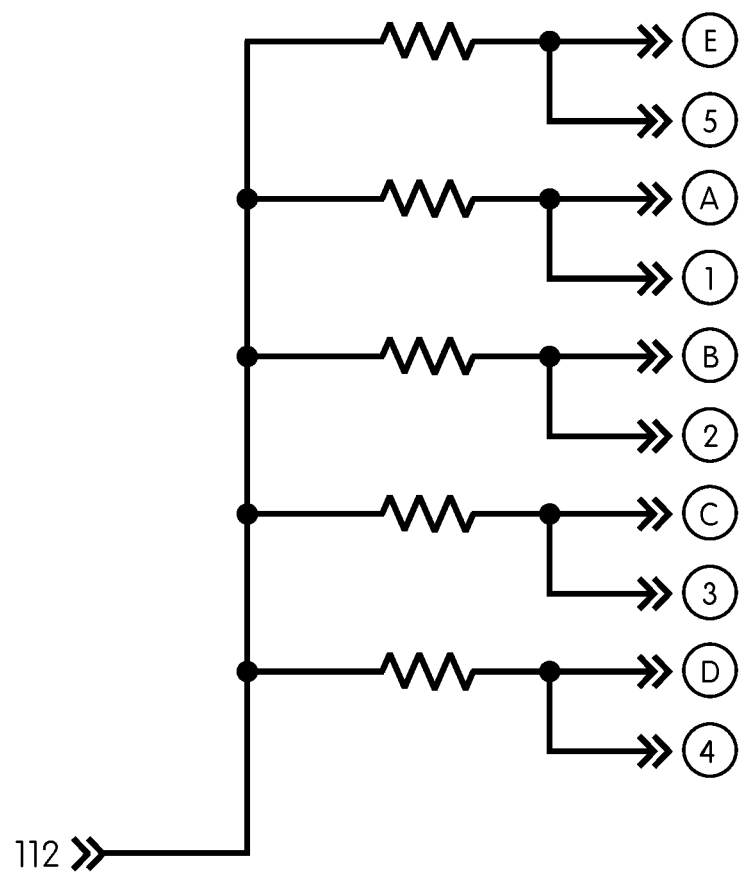
FIG. 5 shows a schematic diagram of a non-limiting embodiment of pneumatic communication associated with the manifold.

Referring to FIG. 5, a schematic diagram of a non-limiting embodiment of pneumatic communication associated with the manifold 110 is shown. As shown in FIG. 5, the air pump 112 may be in fluid communication with orifices A-E; in other non-limiting examples, the air pump 112 may be in fluid communication with orifice F and orifice G (as described herein). In this way, the air pump 112 may pump air into the simulated airway 101 via the various orifices. The air pump 112 may also be in fluid communication with pressure transducers 1-5, and other pressure transducers (e.g., pressure transducers 6 or 7) in the system 100. In this way, the air pump 112 may pump air to the various pressure transducers, such that the various pressure transducers provide a reading of the pressure applied by the air pump 112.

With continued reference to FIG. 5, the various orifices may be in fluid communication with their corresponding pressure transducers. For example, orifices A-E may be in fluid communication with pressure transducers 1-5, respectively. Orifices F-G (not shown) (or any other orifice) may be in fluid communication with their corresponding pressure transducers 6-7 (or any other corresponding pressure transducers). In this way, each pressure transducer may provide a reading of the air pressure at its corresponding orifice.

Carina Touch Sensing

Referring back to FIGS. 1-4, the carina is the term used to describe the anatomical feature at the bifurcation of the trachea into the left and right main bronchial tubes. Innervation of this area of the airway of a real human patient is such that, when contact is made by the ET tube 10 or some other medical instrument, a cough reflex is elicited. It is desirable to be able to simulate a cough reflex by detecting when contact occurs with the carina in the simulated airway 101.

A method for sensing contact with the carina is provided by the placement of a carina component 114 at the position of the carina. The carina component 114 may be positioned at the bifurcation point between the left main stem 104 and right main stem 106, as shown in FIGS. 1-4. The carina component 114 may be a plastic component. The carina component 114 may be in communication with a pressure transducer 7, as shown in FIG. 1. A compressive force (e.g., from an ET tube 10 pressing against the simulated airway 101 at the bifurcation point between the left main stem 104 and right main stem 106) that deforms the simulated airway 101 at the bifurcation point between the left main stem 104 and the right main stem 106 may cause the deformed simulated airway 101 to press against the carina component 114 and/or exert a pressure thereon. The pressure exerted on the carina component 114 by the simulated airway 101 may cause the carina component 114 to communicate a signal to the pressure transducer 7, and the controller 111 in communication with the pressure transducer 7 determines that the carina has been touched by the ET tube 10. The controller 111 may cause the manikin to make a coughing response upon determining that the carina component 114 has been touched by the ET tube 10 pressing against the simulated airway 101 at the bifurcation point between the left main stem 104 and the right main stem 106.

Referring to FIG. 2, the carina component 114 may further include an orifice G in fluid communication with pressure transducer 7. In this way, the air pressure at orifice G, associated with the carina component 114 may be determined by pressure transducer 7, which may be used to determine whether the controller 111 is to generate a simulated cough.

Sensing Metered-Dose Inhaler

Metered-dose inhalers are used to deliver albuterol or other drugs by means of an aerosol spray. The spray is produced by an aerosol propellant having a chemical composition that may be sensed by means of a gas sensor 116, as shown in FIGS. 1 and 4.

The gas sensor 116 may be configured in a side-stream sampling arrangement in which the air pump 112 used in the ET tube position-sensing system (described above) is also used to draw air from the airway through gas sensor 116 (see FIG. 1). In other examples, a separate air pump may be used such that the side-stream sampling arrangement utilizes the second air pump 112b, and the ET tube position-sensing system utilizes the first air pump 112a (see FIG. 4). The air pump 112 may operate continuously, such that the gas sensor 116 continuously determines whether the airborne gas, which it is configured to detect, is present. In some non-limiting examples, the gas sensor 116 is configured to sense an airborne drug (e.g., albuterol or other airborne drug) commonly used in inhalers to determine whether the airborne drug is in the airway simulation system 100. In other non-limiting examples, the gas sensor 116 may be configured to detect another gas associated with an inhaler, such as a propellant used to release the airborne drug from the inhaler (e.g., R-134a propellant). The gas to be sensed may be a volatile organic compound (VOC), and the gas sensor 116 may be a VOC gas sensor.

Air from the simulated airway 101 may be removed therefrom (e.g. removed from the hollow body) and pumped to the gas sensor 116 via the air pump 112. After the gas sensor 116 has determined the presence or absence of the gas configured to be detected, the sampled air may be returned by the air pump 112 to the simulated airway 101 via the ET tube position sensing orifices (e.g., orifices A-G) or via the right main stem 106.

Producing Airway Edema and ET Tube Cuff Leak

Figure 6:
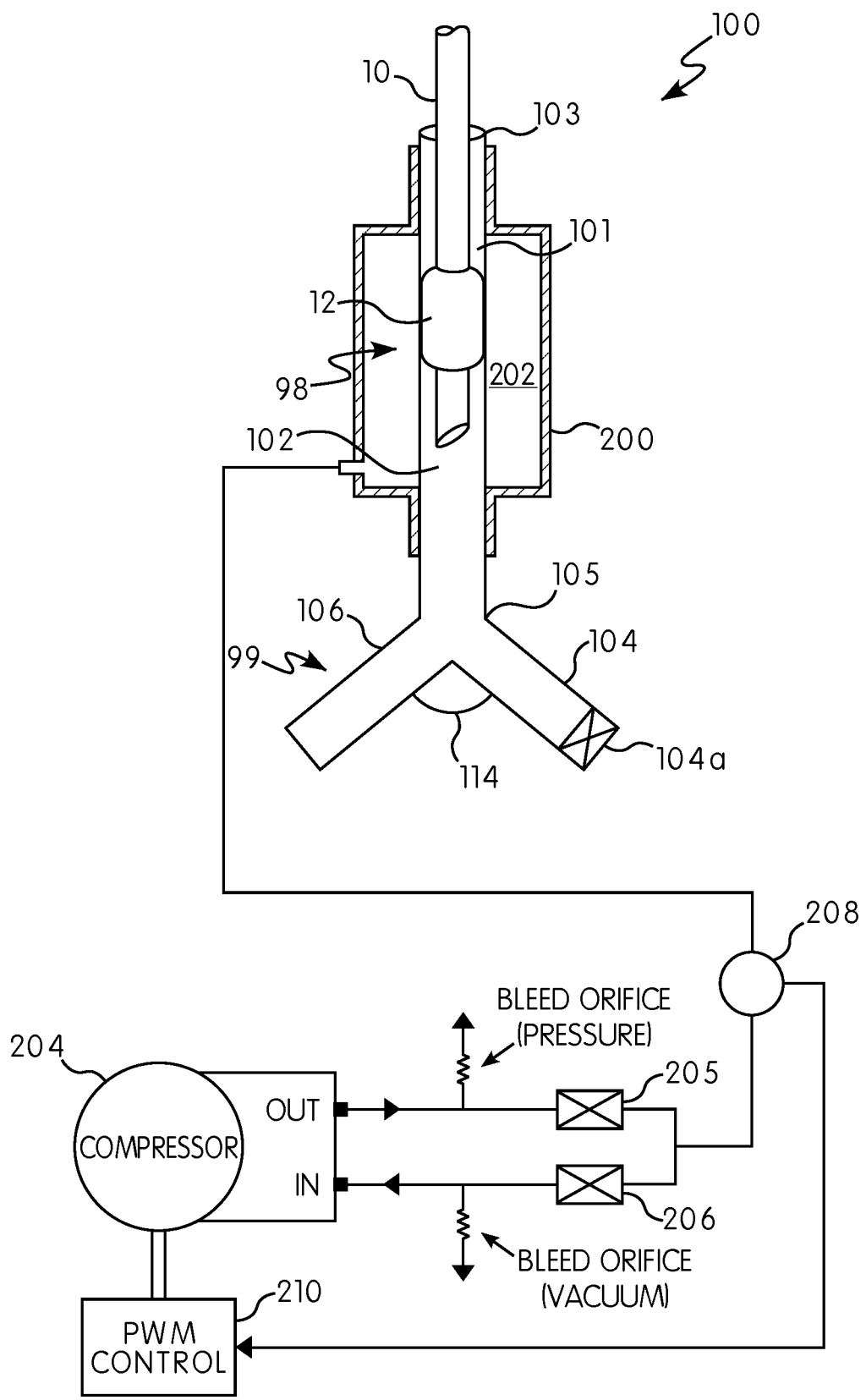
FIG. 6 shows a schematic view of the mechanical airway of FIG. 1 with an additional apparatus which allows for the simulation of airway edema.

Referring to FIG. 6, although airway edema (swelling) and ET tube cuff leak are unrelated conditions, a common mechanism may be employed that can simulate both conditions. Edema may be created by a Starling resistor, which may include a rigid, airtight cylinder 200 defining a space 202, through which the trachea portion 102 of the simulated airway 101 passes coaxially. When the pressure in the space 202 outside the trachea portion 102 but inside the cylinder 200 is greater than the pressure inside the airway, the trachea portion 102 begins to collapse. Conversely, when the pressure in the space 202 but outside of the trachea portion 102 is reduced relative to the pressure inside the trachea portion 102, the trachea portion 102 expands. In this way, the mechanism may be made to collapse (simulating edema) or to expand, creating a gap between the ET tube cuff 12 and the inside of trachea portion 102 that represents the upper simulated airway 101. This results in simulation of an ET tube cuff leak.

In the implementation described here, the air pressure inside the cylinder 200 is either increased or decreased by means of an air compressor 204. A calibrated leak may be applied in the cylinder pneumatic circuit by valves 205 and 206, such that the pressure inside the space 202 may be controlled by simply varying the speed of compressor 204. A pneumatic diagram is provided in FIG. 6 which illustrates the way in which compressor 204 may be made to either pressurize or evacuate the space 202 inside the cylinder 200. A pressure transducer 208 may be provided which is in communication with cylinder 200 such that closed-loop control of the cavity pressure may be implemented. The speed of compressor 204 may be controlled by a pulse width modulator 210 in communication with the pressure transducer 208, in response to the pressure sensed by pressure transducer 208.

Figure 8:
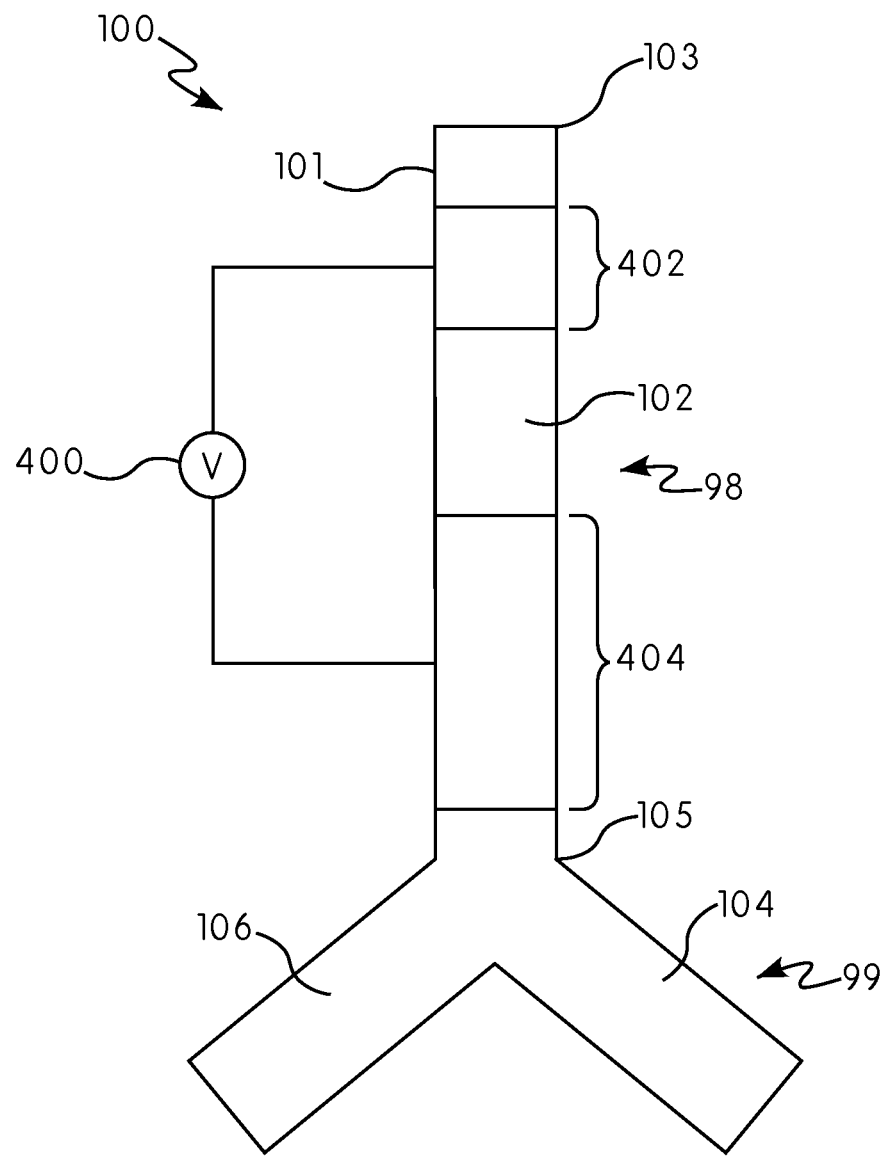
FIG. 8 shows a schematic view of another non-limiting embodiment of an advanced mechanical airway utilizing electroactive polymers.

Referring to FIG. 8, in another example, the collapse and expansion of the trachea portion 102 may be achieved through use of a class of materials known as electroactive materials. Electroactive materials refer to flexible materials that, through physical means that depend on the type of electroactive material, respond reversibly to an applied voltage by deforming and remain deformed for as long as the voltage is applied. In this way, they behave much like an artificial muscle. The electroactive material may be a polymer.

With continued reference to FIG. 8, a voltage source 400 may be connected to the simulated airway 101, such as the trachea portion 102 of the simulated airway 101. The trachea portion 102 may include a Zone A 402 and a Zone B 404. Zone A 402 and Zone B 404 may be made of an electroactive material. Zone A 402 and Zone B 404 may be made of the same or a different electroactive material. The voltage source 400 may be connected to Zone A 402 and/or Zone B 404. The controller 111 (from FIG. 1) may determine when to activate the voltage source 400. Zone A 402 and Zone B 404 may be located along the trachea portion 102. Zone A 402 may be located along the trachea portion 102 in the area of the larynx, and Zone B 404 may be located along the trachea portion 102 in the area of the pharynx, in order to be able to simulate laryngospasm and pharyngeal edema, respectively, using the voltage source 400.

Controller

Referring back to FIG. 1, the controller 111 may be included in the airway simulation system 100 to control any number of functions associated with the airway simulation system 100 and may be in communication with any of the components described herein. The controller 111 may be in wired or wireless communication with any of the components described herein. The controller 111 may include a computing device capable of sending and receiving electrical signals. The controller 111 may include software run thereon, which determines the controller's 111 response upon receiving a predetermined input from a component (e.g., a sensor). Various non-limiting examples of functions of the controller are described hereinafter.

In one non-limiting example, the controller 111 may be in communication with at least one pressure transducer (e.g., pressure transducers 1-7), such that the pressure sensed by the pressure transducer causes the controller to generate a simulated response. For example, the pressures sensed by the pressure transducer may indicate a position of the ET tube 10, and the controller 111 may determine the position of the ET tube 10 and generate a simulated human response based on the position of the ET tube 10. In another example, the controller 111 may be in communication with pressure transducer 7 (associated with the carina component 114), and upon a determination that an object has contacted the simulated airway 101 at the bifurcation point, the simulated airway 101 exerting a pressure on the carina component 114 (based on the pressure reading from pressure transducer 7), the controller 111 may generate a simulated cough response.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An airway simulation system comprising:
    a simulated airway comprising:
        a hollow body defining a passageway therein comprising a first portion and a second portion,
            wherein the first portion comprises a first section having a proximal end and a distal end,
            wherein the second portion comprises a bifurcated section having a left branch section and a right branch section,
            wherein the second portion connects to the first portion at the distal end of the first portion; and
        at least one orifice defined along the hollow body and in communication with at least one pressure transducer;
    a manifold comprising an input and at least one output in fluid communication with the at least one orifice; and
    an air pump in fluid communication with the input to provide airflow through the at least one orifice into the hollow body of the simulated airway,
    wherein one branch of the left branch section and the right branch section is configured to receive airflow from a distal end, and the other of the left branch section and the right branched section comprises a cap at a distal end to prevent airflow from being received by the distal end of the capped branch.

2. The airway simulation system of claim 1, wherein the at least one orifice comprises a plurality of orifices, wherein the plurality of orifices comprises:
    a first orifice defined along the first portion;
    a second orifice defined along the first portion, wherein the second orifice is defined closer to the distal end of the first portion than the first orifice;
    a third orifice defined along the right branch section; and
    a fourth orifice defined along the left branch section.

3. The airway simulation system of claim 2, wherein the first orifice, the second orifice, the third orifice, and the fourth orifice are in communication with a first pressure transducer, a second pressure transducer, a third pressure transducer, and a fourth pressure transducer, respectively.

4. The airway simulation system of claim 3, wherein the at least one output comprises at least four outputs, wherein each output is in fluid communication with one of the first orifice, the second orifice, the third orifice, and the fourth orifice, wherein the air pump is in fluid communication with the input to provide airflow through the first orifice, the second orifice, the third orifice, and/or the fourth orifice into the hollow body of the simulated airway.

5. The airway simulation system of claim 1, further comprising a controller, wherein the at least one pressure transducer is in communication with the controller, wherein a pressure sensed by the at least one pressure transducer causes the controller to generate a simulated response.

6. The airway simulation system of claim 1, further comprising a carina component and a carina pressure transducer, wherein the carina component is positioned at a bifurcation point between the left branch section and the right branch section, wherein the carina component is in communication with the carina pressure transducer.

7. The airway simulation system of claim 6, further comprising a controller, wherein the carina pressure transducer is in communication with the controller, such that when the simulated airway exerts a pressure on the carina component, a signal is communicated to the carina pressure transducer to cause the controller to generate a simulated cough response.

8. The airway simulation system of claim 1, further comprising a gas sensor configured to sense the presence of a gas released by an inhaler in the simulated airway.

9. The airway simulation system of claim 8, further comprising a pump configured to pump gas from the hollow body of the simulated airway to the gas sensor.

10. The airway simulation system of claim 9, wherein the pump is configured to pump the gas sensed by the gas sensor back into the simulated airway via the at least one orifice.

11. The airway simulation system of claim 8, wherein the gas comprises a volatile organic compound or R-134a propellant.

12. The airway simulation system of claim 1, further comprising a lung simulator in fluid communication with the branched section configured to receive airflow from the distal end.

13. The airway simulation system of claim 12, wherein the lung simulator is configured to flow air into the simulated airway through the branched section configured to receive airflow from the distal end, wherein the rate at which the air is flowed into the simulated airway simulates human lung activity.

14. The airway simulation system of claim 1, further comprising a medical instrument configured to be inserted into the proximal end of the first portion of the hollow body of the simulated airway.

15. The airway simulation system of claim 14, wherein the medical instrument comprises an endotracheal (ET) tube.

16. The airway simulation system of claim 15, further comprising a controller configured to generate a simulated human response based on a position of the ET tube in the hollow body of the simulated airway.

17. The airway simulation system of claim 16, wherein the controller communicates with the at least one pressure transducer in communication with the at least one orifice of the simulated airway to determine the position of the ET tube in the hollow body of the simulated airway.

18. A method for simulating a human airway comprising:
providing the airway simulation system according to claim 1;
inserting an endotracheal (ET) tube into the hollow body of the simulated airway; and
detecting a position of the ET tube in the hollow body of the simulated airway.

19. The method of claim 18, further comprising:
generating, via a controller, a simulated human response upon detecting the position of the ET tube in the hollow body of the simulated airway.

20. The method of claim 19, wherein the controller communicates with the at least one pressure transducer in communication with the at least one orifice of the simulated airway to determine the position of the ET tube in the simulated airway.

\* \* \* \* \*